United States Patent [19]

Rogers et al.

[11] Patent Number: 4,479,620
[45] Date of Patent: Oct. 30, 1984

[54] WING LOAD ALLEVIATION SYSTEM USING TABBED ALLERONS

[75] Inventors: John T. Rogers; Kenneth J. R. Manning, both of Bellevue, Wash.

[73] Assignee: The Boeing Company, Seattle, Wash.

[21] Appl. No.: 537,557

[22] Filed: Oct. 3, 1983

Related U.S. Application Data

[63] Continuation of Ser. No. 923,940, Jul. 13, 1978, abandoned.

[51] Int. Cl.³ ............................................. B64C 9/10
[52] U.S. Cl. .............................. 244/75 R; 244/90 R
[58] Field of Search ............... 244/75 R, 76 R, 76 C, 244/82, 90 R, 90 A, 203, 215

[56] References Cited

U.S. PATENT DOCUMENTS

| | | | |
|---|---|---|---|
| 2,264,233 | 11/1941 | Batts | 244/90 R |
| 2,354,042 | 7/1944 | Munk | 244/90 R |
| 2,357,465 | 9/1944 | Focht | 244/90 R |
| 2,548,787 | 4/1951 | Heberding | 244/90 R |
| 2,568,812 | 9/1951 | Lee | 244/90 R |
| 2,718,366 | 9/1955 | Darby | 244/90 A |
| 2,734,704 | 2/1956 | Vogt | 244/82 |
| 2,742,245 | 4/1956 | Harpoothian et al. | 244/203 |
| 2,743,889 | 5/1956 | White | 244/76 R |
| 2,745,623 | 5/1956 | Harpoothian et al. | 244/90 R |
| 2,813,689 | 11/1957 | Norton et al. | 244/82 |
| 2,951,663 | 9/1960 | Strang | 244/90 B |
| 2,957,656 | 10/1960 | Lewis et al. | 244/76 R |
| 3,120,935 | 2/1964 | Perrin | 244/90 R |
| 3,369,781 | 2/1968 | Cichy et al. | 244/90 R |
| 3,561,702 | 2/1971 | Jones | 244/203 |
| 3,790,106 | 2/1974 | Sweeney et al. | 244/203 |

Primary Examiner—Galen L. Barefoot
Attorney, Agent, or Firm—Christensen, O'Connor, Johnson & Kindness

[57] ABSTRACT

A wing load alleviation system for redistributing aircraft loads encountered during flight by symmetrically deflecting the outboard ailerons of the aircraft includes a trailing edge tab pivotally supported on each outboard aileron. As each outboard aileron is deflected by the wing load alleviation system to reduce wing bending moments, the corresponding tab is deflected in aerodynamic opposition thereto so as to reduce wing torsional loads caused by the deflection of its associated outboard aileron. The span of each tab is equal to or less than that of its associated outboard aileron, and the chord of each tab is a predetermined fraction of that of its associated outboard aileron. Each tab may be mechanically linked to its associated outboard aileron so that deflection of the outboard aileron causes a proportional but opposite deflection of the tab.

6 Claims, 14 Drawing Figures

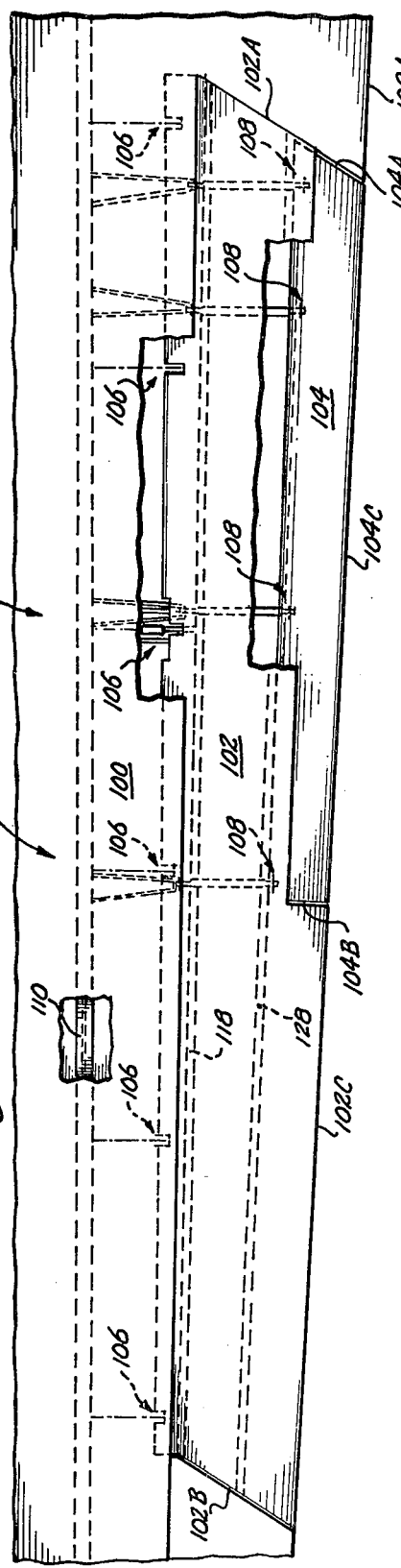

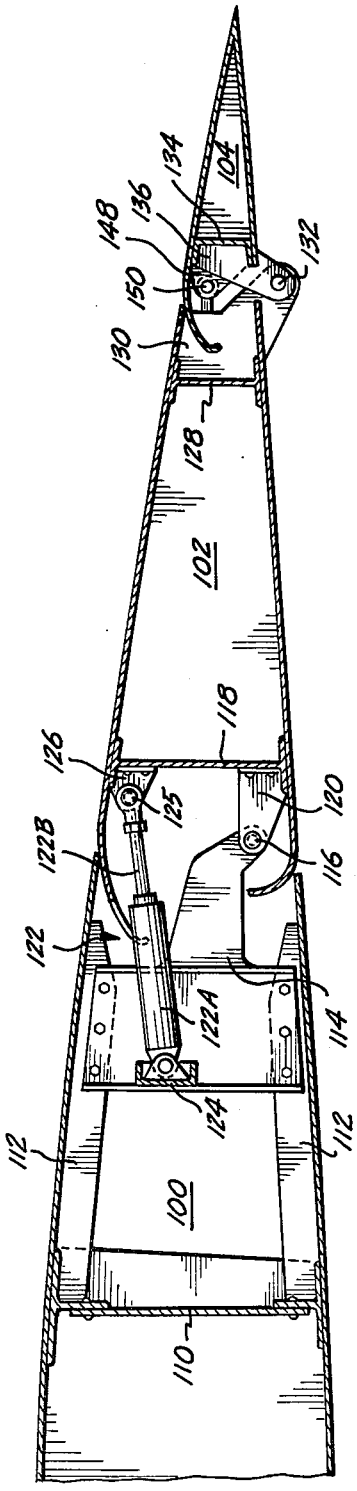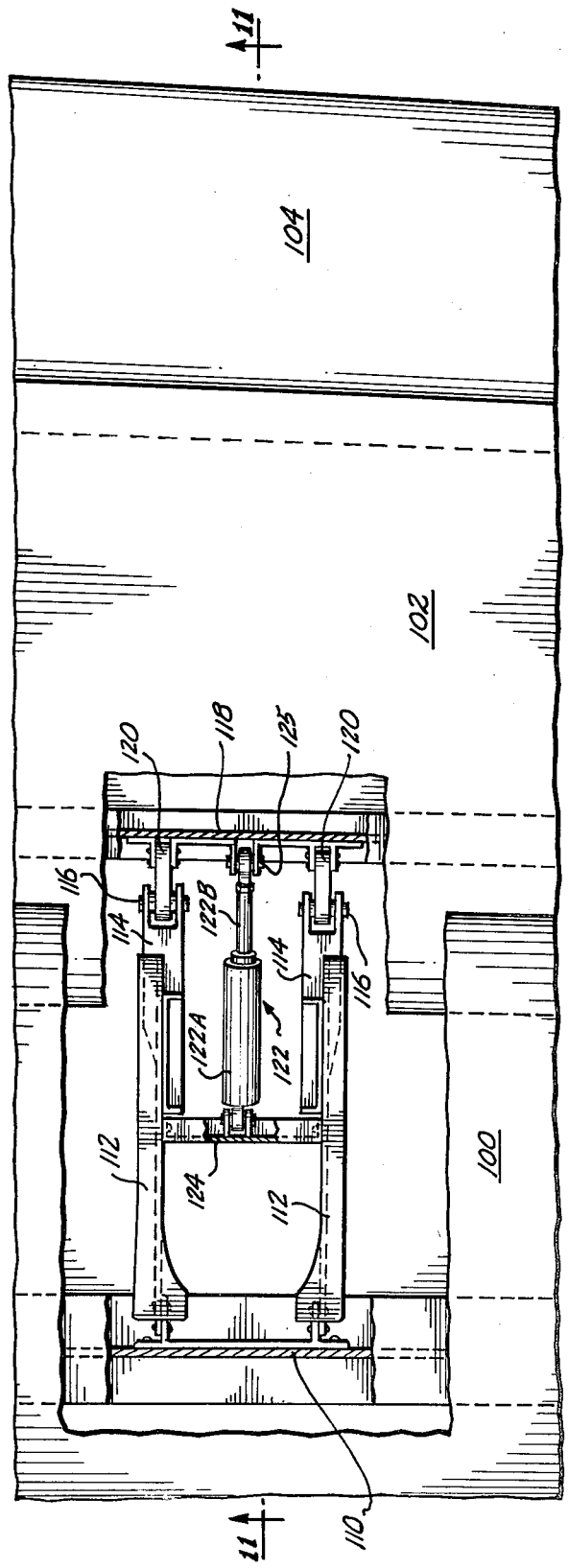

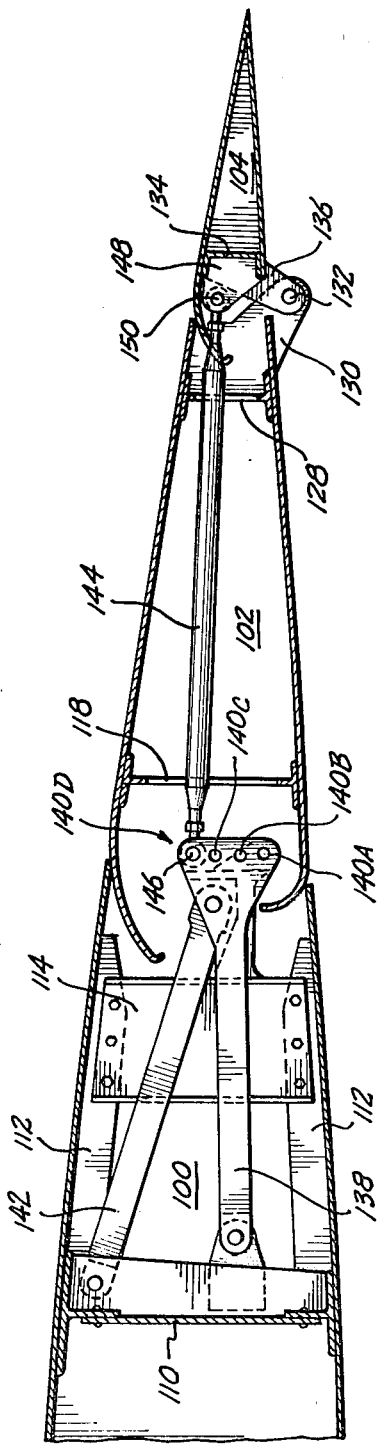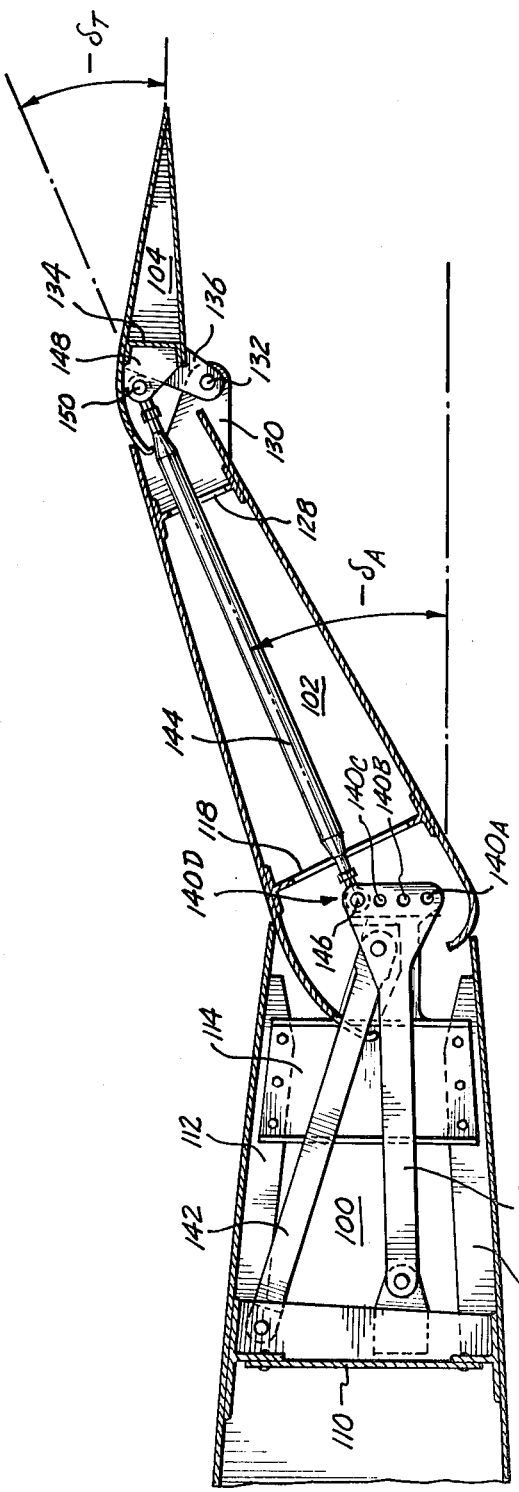

WING LOAD ALLEVIATION SYSTEM USING TABBED AILERONS

This application is a continuation/application based on prior copending application Ser. No. 923,940, filed July 13, 1978, now abandoned.

FIELD OF THE INVENTION

This invention generally relates to systems for alleviating the loads on an aircraft wing encountered in flight and particularly resulting from pilot-induced aircraft maneuvers and air gusts, and, more particularly, to such systems which use the outboard ailerons of the wings for such load alleviation.

BACKGROUND OF THE INVENTION

In modern day aircraft, it is desirable to reduce the loads applied during flight to the aircraft structure, and particularly to the aircraft wings, so as to result in increased energy efficiency and increased payload or range capability of the aircraft. Since the wings of an aircraft are designed to be capable of withstanding certain maximum wing loads, with a predetermined load distribution in the spanwise and chordwise directions of the wing, it will be recognized that a redistribution or other alleviation of wing loads encountered during flight can also result in significant reductions in the design requirements for certain of the wing components, and therefore in the overall structural weight of the wings, therefore further increasing the energy efficiency and range or payload capability of the aircraft.

A number of wing load alleviation systems have been proposed which use the outboard ailerons of the aircraft for redistributing wing loads encountered during flight. As is well known, ailerons, both outboard and inboard, typically are used to effect roll control of the aircraft, in which case the ailerons are deflected differentially, that is, the ailerons on one wing are deflected upwardly to reduce lift on the associated wing, while the ailerons on the other wing are deflected downwardly to increase lift on the associated wing. In the proposed wing load alleviation systems, however, both outboard ailerons are deflected symmetrically upon detection of an excess load condition, typically occurring as a result of a pilot-induced aircraft maneuver or an air gust. Usually, each aileron is deflected upwardly so as to reduce lift on the outboard portion of its associated wing, with the result that the center of lift of each wing is moved inboard to therefore effect an inboard shift in the wing load distribution.

While the use of such wing load alleviation systems theoretically allows a reduction in the weight of the wings due to the decreased design requirements for the outboard portion of the wings, such a reduction has not been achieved in practice, for the deflection of the outboard ailerons at the speeds normally encountered in steady-state flight also induces significantly increased torsional loads on each wing, that is, the aerodynamic forces acting on each deflected aileron causes its associated wing to twist about its spanwise axis. In order to accommodate these significantly increased torsional loads, the design requirements for each wing must be increased so as to result in little or no overall reduction in the weight of the wings. Also, flexing of the wing upon the application of such torsional loads will result in a change in the effective angle of attack of the wing. When a predetermined airspeed is reached, typically less than the maximum certified airspeed of the aircraft, the phenomenon of aileron reversal occurs in which the decrease in lift caused by aileron deflection is balanced by the increase in lift caused by the change in the effective angle of attack. Upon aileron reversal, it will be seen that the aileron loses its effectiveness as a control surface and particularly in alleviation of wing loads.

It is therefore an object of this invention to provide an improved wing load alleviation system using outboard ailerons.

It is another object of this invention to provide such a system which achieves wing load alleviation without significantly increasing wing torsional loads encountered during flight.

It is yet another object of this invention to provide such a system which significantly decreases the probability of aileron reversal occurring airspeeds up to and including the maximum certified airspeed of the aircraft.

It is still another object of this invention to provide such a system which can be easily retrofitted to existing aircraft without the necessity of significant increase in the structural strength of the aircraft wings.

SUMMARY OF THE INVENTION

Briefly, these objects and others that will be apparent to those of ordinary skill in the art are achieved by an improvement in a wing load alleviation system which symmetrically deflects the outboard ailerons of an aircraft so as to alleviate increased aircraft wing loads caused by gusts and pilot-induced maneuvers occurring during flight. The improvement comprises a trailing edge tab pivotally supported on each outboard aileron, each tab being deflected, as its associated outboard aileron is deflected, in aerodynamic opposition to its associated outboard aileron so as to reduce wing torsional loads.

The span of each tab may be equal to or less than that of its associated outboard aileron, and the chord of each tab is a predetermined fraction of that of its associated outboard aileron, typically in the range of substantially 0.15 to substantially 0.5. The tab deflection angle, or that measured from a position in which the tab is faired with its associated outboard aileron, has a predetermined relationship to the aileron deflection angle, or that measured from a position in which the aileron is faired with its associated wing. Preferably, the ratio of the tab deflection angle to the aileron deflection angle is substantially constant, that is, the tab deflection is proportional to the aileron deflection, and may be in the range of substantially 0.4 to substantially 1.5. The tab may be directly driven by the wing load alleviation system, or may be mechanically linked to its associated outboard aileron so that aileron deflection produces a corresponding tab deflection.

BRIEF DESCRIPTION OF THE DRAWINGS

The invention can best be understood by reference to the following portion of the specification, taken in conjunction with the accompanying drawings, in which:

FIG. 9 is a plan view of a portion of the left wing of the aircraft of FIG. 1 and illustrating a specific tabbed aileron configuration;

FIG. 10 is a first expanded portion of the plan view of FIG. 9;

FIG. 11 is a chordwise, cross sectional view taken along the lines 11—11 in FIG. 10;

FIG. 12 is a second expanded portion of the plan view of FIG. 9;

FIG. 13 is a chordwise, cross sectional view taken along the lines 13—13 in FIG. 12; and, FIG. 14 is a cross sectional view corresponding to FIG. 13.

DESCRIPTION OF A PREFERRED EMBODIMENT

Figure 1:
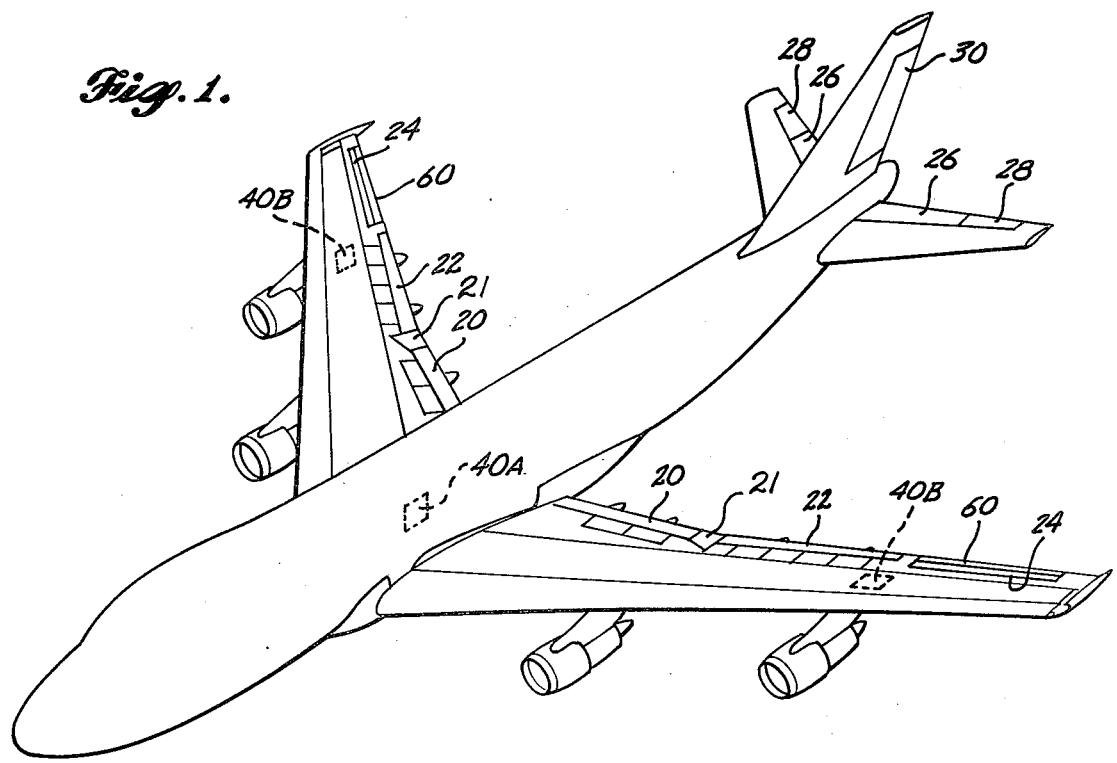
FIG. 1 is pictorial diagram of an aircraft and illustrating the various control surfaces of the aircraft, including the outboard ailerons.

With reference to FIG. 1, the aircraft illustrated therein comprises a modern-day jet transport having a plurality of control surfaces located in each wing and adjacent the trailing edge thereof. Proceeding from the root of each wing adjacent the aircraft's fuselage to each wing tip, these control surfaces comprise the inboard flaps 20, the inboard ailerons 21, the outboard flaps 22, and the outboard ailerons 24. The aircraft also includes additional control surfaces associated with the aircraft empennage which comprise the inboard elevators 26 and the outboard elevators 28 located in the horizontal stabilizers, and the rudder 30 located in the vertical stabilizer.

During flight, the control surfaces described are used, in conjunction with variation in the thrust provided by the aircraft's engines, to effect a change in the aircraft's attitude. Specifically, the inboard and outboard ailerons 21, 24 on opposite sides of the aircraft are deflected differentially during flight to induce a rolling moment in the aircraft about its roll axis, or that passing through the longitudinal centerline of the aircraft fuselage. At relatively low airspeeds, both the inboard and outboard ailerons 21, 24 may be so deflected, whereas at relatively high airspeeds usually only the inboard ailerons 21 are so deflected, with the outboard ailerons 24 being locked out. To induce a pitching moment in the aircraft about its pitch axis, or that transverse to the roll axis, the inboard and outboard elevators 26, 28 on opposite sides of the aircraft may be deflected symmetrically. To induce a yawing moment in the aircraft about its yaw axis, or that normal to a plane established by the roll and pitch axes, the rudder 30 is deflected. Finally, the flaps 20 and 22 are extended and downwardly deflected at relatively low airspeeds, such as encountered during takeoff and landing maneuvers, to provide increased lift.

As can be appreciated, the structural design requirements for the aircraft components, including the wings, are determined by the loads to which those components will be subjected during expected flight conditions. Considering the aircraft wings, the structural design requirements are determined by the aerodynamic forces, including lift, and the resultant loads, which are exerted upon the wing components with and without actuation of the control surfaces including flaps 20 and 22, inboard ailerons 21 and outboard ailerons 24. Typically, these structural design requirements are based upon the load factor, or the acceleration on the wing components due to gravity (expressed in G's), to which the wing components will be subjected. In steady-state, level flight, and as the aircraft passes through a region of substantially constant air pressure, the load factor is 1 G. As the aircraft passes through a region of abruptly changing air pressure, as would be encountered as the aircraft passes through an air gust, or as the pilot causes the aircraft to execute a flight maneuver, different load factors will be encountered which must be considered in establishing the structural design requirements for the wings. For a transport of the type illustrated in FIG. 1, the wings typically are designed to withstand load factors in the range of −1.0 to 2.5 G's.

Wing load alleviation systems are particularly designed to redistribute the loads acting upon each wing when the load factor thereon increases as a result of a pilot-induced, balanced maneuver or as a result of the aircraft encountering an air gust. In a balanced maneuver, the aircraft is caused to change its relative position at a rate of change which is substantially constant, that is, the angular acceleration of the aircraft and its components about any one of the roll, pitch or yaw axes is substantially zero.

Figure 2:
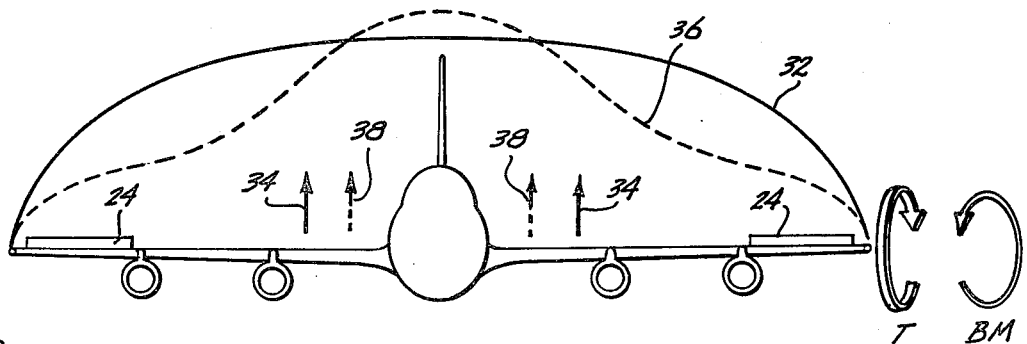
FIG. 2 is a schematic representation of the spanwise lift distribution of the aircraft encountered during flight, with and without the use of the outboard ailerons in a wing load alleviation system.

With reference now to FIG. 2, the spanwise distribution of the lift forces acting upon the aircraft wings during steady-state, level flight is illustrated by the solid line 32, and the resultant of those lift forces, or the center of lift, is illustrated by the solid arrows 34. As the aircraft executes a balanced maneuver, or encounters an air gust, it will be seen that the lift forces will increase, and accordingly increase the load factor on the wing components, but will retain essentially the same distribution 32 and center of lift 34 as illustrated in FIG. 2. The structural design requirements for the wings, therefore, must be chosen so that the wing components are capable of withstanding the loads induced as a result of such lift forces with the distribution and center of lift illustrated, for both steady-state, level flight and upon the occurrence of balanced maneuvers and air gusts.

To reduce the structural design requirements for those wing components adjacent the wing tips, the wing load alleviation systems of the prior art are operative to symmetrically deflect the outboard ailerons 24 upwardly upon the detection of an increase in load factor occasioned by a balanced maneuver or an air gust. As the outboard ailerons 24 are deflected upwardly, they cause a reduction in lift on the outboard portions of each wing and a consequent increase in lift on the inboard portions of each wing. As a result, the spanwise distribution of lift forces is modified, as shown by the dashed line 36, and the center of lift is shifted inboard, as shown by the dashed arrows 38. As can be seen fom a comparison of lines 32 and 36, the outboard reduction in lift forces is greater than the inboard increase in lift forces, with the result that the overall structure design requirements for the aircraft wings can be reduced so as to theoretically provide a reduction in the overall structural weight of the wing components, and a particular reduction in the structural weight of the outboard portions of each wing.

Viewed in another manner, it must be recognized that modern aircraft wings are flexible and therefore capable of flexure about axes parallel to the chordwise and spanwise directions thereof in response to induced loads caused by lift. In particular, an increase in load factor causes each wing to experience a bending moment BM, with reference to an axis parallel to the chordwise direction of the wing (reference FIGS. 2 and 3), so that the wing tips deflect upwardly. A decrease in lift occasioned by the upward deflection of the outboard ailerons 24 therefore also causes a reduction in the bending moment BM experienced during maneuver and gust conditions.

Figure 3:
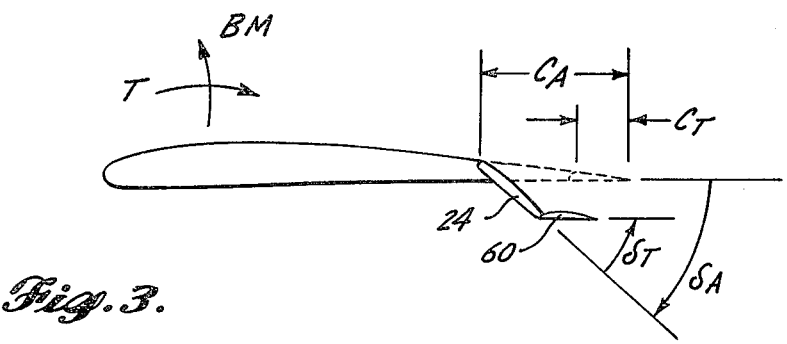
FIG. 3 is a chordwise, cross sectional view of the wing and illustrating the tabbed aileron of the present invention.
Figure 5:
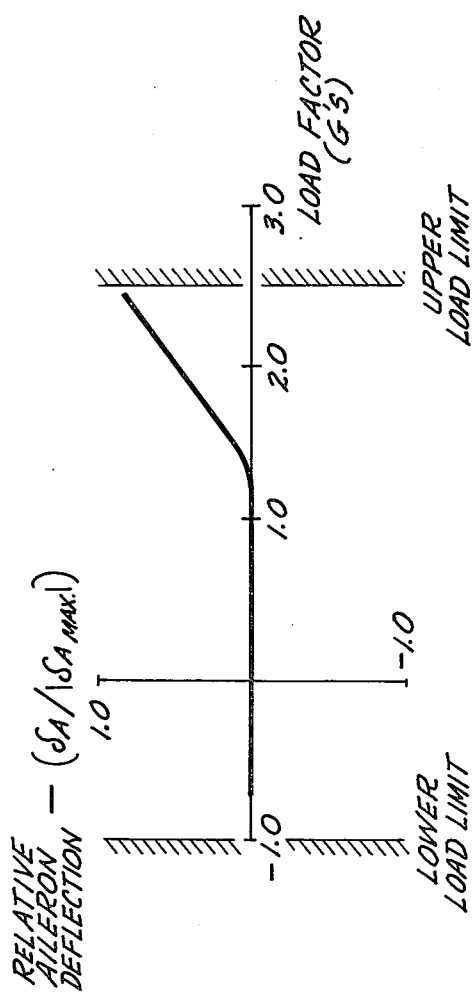
FIG. 5 is a graph illustrating the basic control law used in the system illustrated in FIG. 4, and as also known to the prior art.
Figure 4:
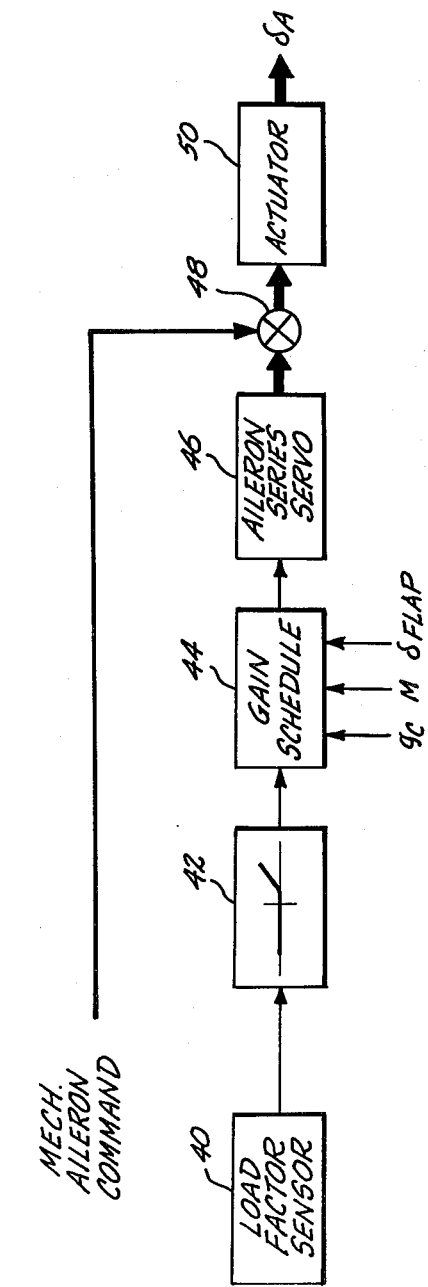
FIG. 4 is a block diagram of the electrical and mechanical components of a typical wing load alleviation system known to the prior art.

With reference now to FIG. 4, the electrical and mechanical components of a typical wing load alleviation system known to the prior art include a load factor sensor 40 which may comprise an accelerometer 40A located in the aircraft fuselage in proximity to the aircraft's nominal center of gravity (FIG. 1) and mounted so as to sense acceleration in a direction normal to a plane established by the pitch and roll axes thereof, and/or a pair of accelerometers 40B located in the aircraft wings in proximity to the outboard ailerons 24 and again sensing acceleration in a direction normal to the plane of the pitch and roll axes. Load factor sensor 40 includes means for summing the signals from accelerometers 40A, 40B to provide an output signal, proportional to average load factor, which is applied to a control circuit 42. The transfer function, or control law, of control circuit 42 is represented by the graph illustrated in FIG. 5, in which relative aileron deflection, in ($\delta_A/|\delta_{Amax}|$) is shown as a function of load factor, in G's. With reference to FIG. 3, $\delta_A$ is the deflection angle of the outboard aileron 24, measured from a faired position thereof aligned with the wing. $\delta_{Amax}$ is the maximum aileron deflection angle that is achieved when the load factor has reached the aircraft's upper load limit. From FIG. 5, it will be seen that control circuit 42 provides a zero output signal for load factors below a predetermined threshold, in the range of 1.1 to 1.33 G's, and then provides a proportionately increased output signal for increasing load factors up to the aircraft's upper load limit (2.5 G's), at which time the output signal has a maximum value representing a desired maximum aileron deflection angle.

The output signal from control circuit 42 is provided to the input of a gain schedule circuit 44 which also receives a plurality of signals, from sensors not illustrated, proportional to: $q_c$, or the measured dynamic air pressure acting on the aircraft; M, or indicated airspeed in Mach number; and, $\delta_{flap}$, or the deflection angle of the flaps 20. As is well known, the effectiveness of any control surface, such as an aileron, is dependent not only upon the indicated airspeed of the aircraft, but also upon the dynamic air pressure that the aircraft is encountering during flight, and is typically evaluated by reference to an equivalent airspeed $V_e$, which can be calculated from the indicated airspeed in Mach number and the dynamic air pressure. The gain schedule circuit 44 accordingly calculates the equivalent airspeed $V_e$ and proportionally modifies the output signal from control circuit 42 thereby. In addition, most modern day aircraft are designed to have a different upper design limit when the flaps 20, 22 are extended and deflected, or down, than when the flaps 20, 22 are retracted and faired, or up. Therefore, the output signal from control circuit 42 must also be proportionally modified therefore, so that maximum aileron deflection is obtained at the required upper design limits for both flaps-up and flaps-down conditions. Also, the wing load alleviation systems of the prior art often have experienced the phenomenon of aileron reversal, discussed in more detail hereinafter, which makes it desirable that aileron deflections be reduced or inhibited when the aircraft has reached a predetermined speed known as the aileron reversal speed. Accordingly, gain schedule circuit 44 may act to modify or even inhibit the production of an output signal therefrom when the equivalent airspeed $V_e$ equals the aileron reversalspeed.

The output signal from gain schedule circuit 44 is applied to the input of an aileron series servo 46 which converts this output signal into a proportional mechanical movement which in turn is supplied to a mechanical summing junction 48 to which is also applied a mechanical aileron command from the pilot's control stick. The mechanical output from summing junction 48 is applied to the input of an actuator 50 whose output is mechanically interconnected with the outboard ailerons 24. Actuator 50 may comprise any hydraulically-operated actuating mechanism which is responsive to the mechanical output from summing junction 48 to provide a corresponding deflection of the outboard ailerons 24. Under flight conditions in which the wing load alleviation system is operative, the mechanical aileron command from the pilot typically will be zero so that the actuator 50 deflects the outboard ailerons 24 in response to the mechanical output from the aileron series servo 46.

Figure 6:
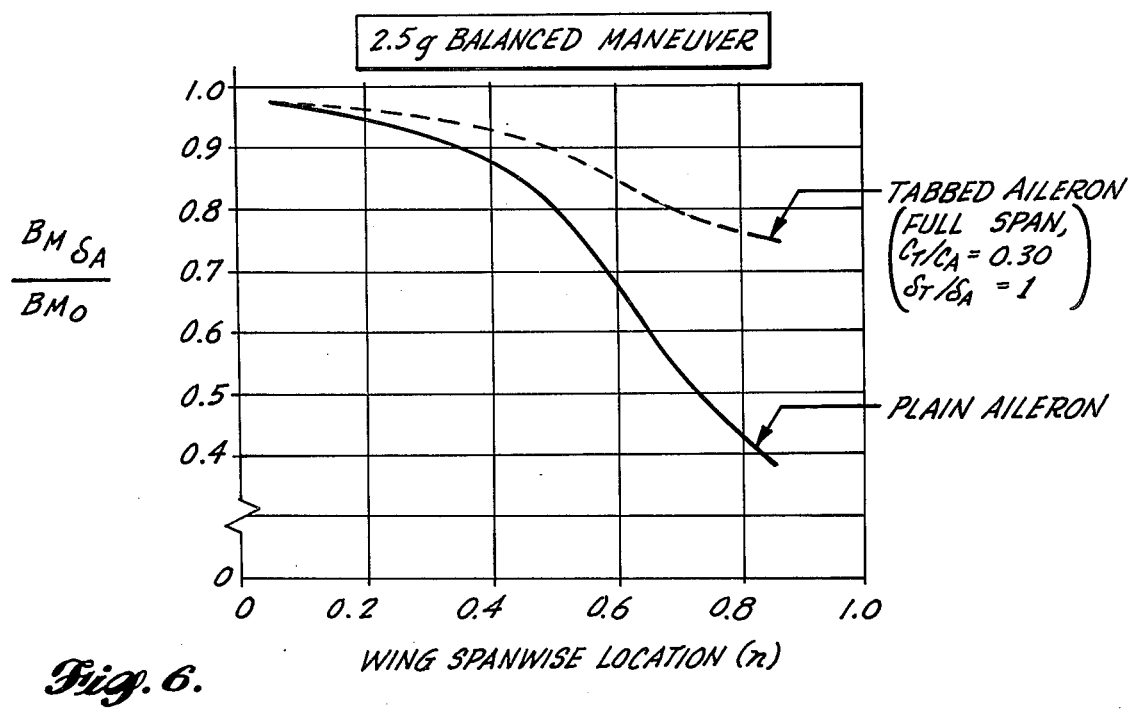
FIG. 6 is a graph illustrating how the relative bending moment of the wing varies in a spanwise direction thereof, with the use of both a plain aileron and a tabbed aileron in a wing load alleviation system.

The effectiveness of sucn a wing load alleviation system in reducing the bending moment BM on each wing can be seen from FIG. 6, in which relative bending moment is plotted as a function of wing spanwise location. The relative bending moment is expressed in terms of the ratio of $BM_{\delta_A}$, or the bending moment obtained upon deflection of the outboard aileron through an angle $\delta_A$, to $BM_0$, or, the bending moment obtained when the outboard aileron is faired. The wing spanwise location is expressed in $\eta$, where $\eta$ equals the length along the spanwise axis of the wing between any given location on the wing and the wing root, divided by the span of the wing.

The data in FIG. 6 represents that calculated for an aircraft of the type illustrated in FIG. 1 and undertaking a balanced maneuver in which: the load factor is equal to 2.5 G's, the upper load limit of the aircraft; M equals 0.875; $V_e$ equals 362 knots; and, the outboard aileron is deflected through an angle $\delta_A$ of $-25°$ (reference FIG. 3). It will be seen by reference to the solid line curve in FIG. 6, identified as "plain aileron," that at all wing spanwise locations, the bending moment obtained upon operation of the wing load alleviation system is less than that obtained when the outboard aileron is faired, and that such bending moment relief is most significant at the outboard wing spanwise locations. For example, the relative bending moment is approximately 0.4 where $\eta$ is approximately 0.8, representing a substantially 60% reduction in bending moment at a wing spanwise location which is 80% of the total wing span, measured fom the wing root.

Figure 7:
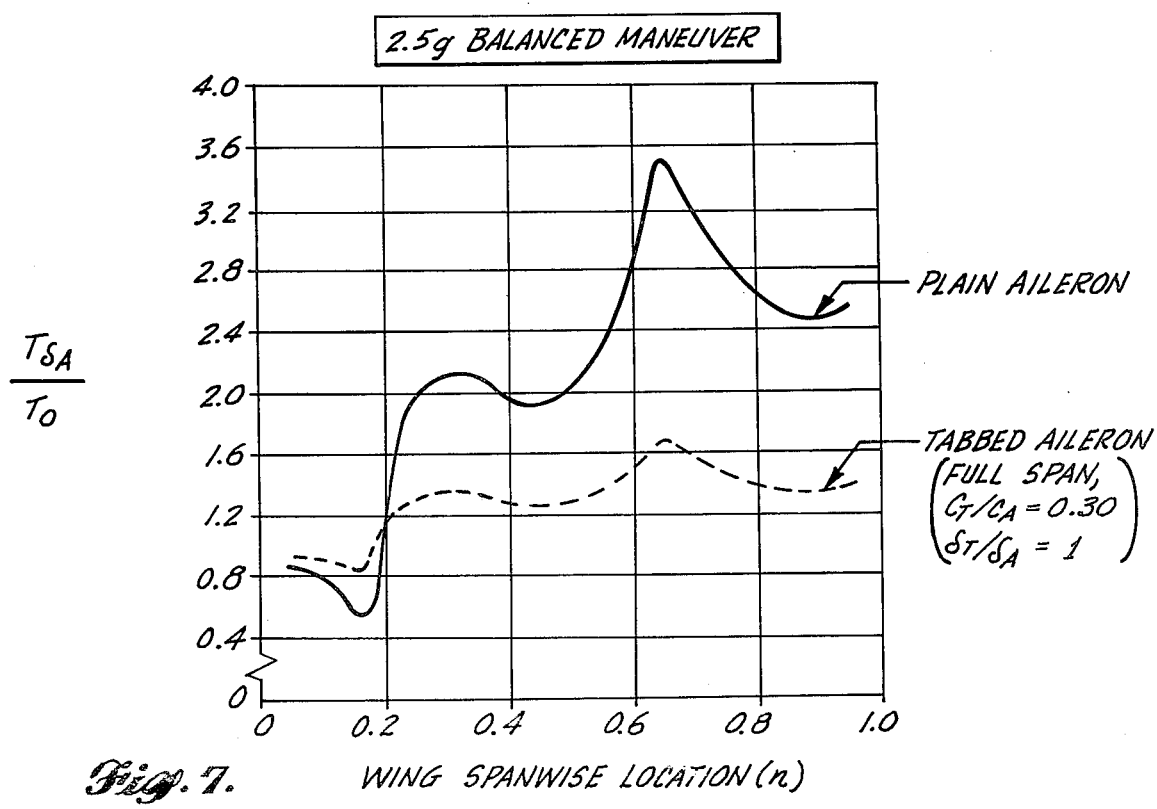
FIG. 7 is a graph illustrating how the relative torsional load of the wing varies in a spanwise direction thereof, with the use of both a plain aileron and a tabbed aileron in a wing load alleviation system.

While effective in reducing the bending moment BM, the wing load alleviation systems of the prior art have encountered serious drawbacks which significantly reduce their usefulness in most applications. Considering now FIG. 7, the relative torsional load on each wing is plotted as a function of the wing spanwise location, is $\eta$. The relative torsional load is expressed in terms of the ratio of $T_{\delta A}$, or the torsional load T (that about the spanwise axis of the wing, reference FIGS. 2 and 3) obtained upon deflection of the outboard aileron through an angle $\delta_A$, to $T_0$, or that obtained when the outboard aileron is faired. The data in FIG. 7 is calculated for an aircraft of the type illustrated in FIG. 1, and given the same conditions as were used for the data illustrated in FIG. 6. From the solid line curve identified as "plain aileron" in FIG. 7, it will be seen that operation of the wing load alleviation system increases the wing torsional load over most of the wing span, and particularly at the outboard wing spanwise locations. For example, the relative torsional load reaches a peak of approximately 3.5 where $\eta$ is approximately 0.65, representing an approximate 250% increase in the wing torsional load at that spanwise location.

It therefore will be appreciated that although wing load alleviation systems using outboard ailerons permit a reduction in wing bending moments, they also significantly increase wing torsional loads, particularly at relatively high airspeeds.

Accordingly, the reduction in the structural design requirements for the wing to resist flexure about its chordwise axes in response to bending moments is offset by the increase in structural design requirements for the wing to resist flexure about its spanwise axis in response to torsional loads so that use of the wing load alleviation system does not permit a significant reduction in the structural weight of the wings to be achieved.

Also, the application of torsional loads to the wings by the use of wing load alleviation systems in many cases result in the phenomenon of aileron reversal, in which the aileron loses its effectiveness as a control surface. As the outboard aileron is deflected upwardly under control of the wing load alleviation system, the torsional load induced thereby in the wing causes the wing to flex about its spanwise axis so that the leading edge thereof pitches upwardly, thereby changing the effective angle of attack of the leading edge of the wing with respect to the oncoming airstream and therefore increasing the lift locally generated at the leading edge of the wing. As airspeed increases, the leading edge of the wing continues to pitch upwardly and, at a predetermined airspeed, typically less than the maximum certified airspeed of the aircraft, the increase in lift locally generated at the leading edge of the wing balances the decrease in lift occasioned by the upward deflection of the outboard aileron so that the overall wing lift is substantially the same as if the outboard aileron had not been deflected. Therefore, at airspeeds at and above the aileron reversal speed, the wing load alleviation systems of the prior art not only significantly increase wing torsional loads, but also lose whatever effectiveness they had in providing wing load alleviation.

The present invention rests upon the discovery that each outboard aileron can be provided with a trailing edge tab whose structure and operation, to be described hereinafter, allows the outboard ailerons to provide bending moment relief under control of a wing load alleviation system, while yet not significantly increasing wing torsional loads.

With reference now to FIGS. 1 and 3, each outboard aileron 24 is provided with a trailing edge tab 60 whose own trailing edge coincides with that of its associated outboard aileron 24. The chord $C_T$ of the tab 60, measured from its leading edge to its trailing edge, is a predetermined fraction of the chord $C_A$ of its associated outboard aileron 24, measured from its leading edge to its trailing edge. As discussed hereinafter, the chord ratio $C_T/C_A$ is a matter of design. The span of each tab 60 preferably is equal to the span of its associaed outboard aileron 24. However, the tab span may be chosen to be less than that of the aileron span, as discussed hereinafter. The tab 60 is secured adjacent its leading edge to its associated outboard aileron 24 so as to pivot about an axis parallel to the spanwise axis of outboard aileron 24, and is mechanically linked to outboard aileron 24 so that tab 60 is deflected through an angle $\delta_T$, measured from a faired position in which the tab 60 is aligned with outboard aileron 24, as outboard aileron 24 is deflected through an angle $\delta_A$. As illustrated in FIG. 3, $\delta_T$ increases in a direction opposite that of $\delta_A$, so that as the outboard aileron 24 is deflected in a first direction with respect to its associated wing, the tab 60 is deflected in a second, opposite direction with respect to outboard aileron 24. Preferably, the deflection angle ratio $\delta_T/\delta_A$ equals 1, although other deflection angle ratios are contemplated.

As previously described, the detection of an increase in load factor occasioned by an air gust or a pilot-induced maneuver causes the outboard aileron 24 to be deflected upwardly, or, through an angle $-\delta_A$, in proportion to the increase in load factor, and up to the upper load limit of the aircraft. As the outboard aileron 24 deflects upwardly, the tab 60 deflects downwardly with respect to the outboard aileron 24 through an angle $-\delta_T$. This relative downward deflection of the tab 60 results in aerodynamic forces being exerted on the tab 60 which oppose those acting on its associated outboard aileron 24. As a result, the decrease in lift occasioned by the upward deflection of the outboard aileron 24 is reduced from that obtained where tab 60 is faired or where no tab is provided. However, the outboard aileron 24 still provides an overall decrease in lift over the situation where the outboard aileron 24 is faired, inasmuch as the chord $C_T$ of the tab 60 is a fraction of the chord $C_A$ of the outboard aileron 24.

The effect of the tab 60 can be seen by reference to the dotted line curves illustrated in FIGS. 6 and 7, which represent the calculated data obtained for aircraft of the type illustrated in FIG. 1 and for the conditions previously described, wherein the span of the tab is equal to that of the outboard aileron, the tab/aileron chord ratio $C_T/C_A$ equals 0.30, and the deflection angle ratio $\delta_T/\delta_A$ equals 1. In FIG. 6, it will be seen that the tabbed aileron is less effective than the plain, or untabbed, aileron in providing bending moment relief. However, the tabbed aileron still provides bending moment relief over substantially the entire wing span, and a significant amount of bending moment relief at the outboard wing spanwise locations. For example, the relative bending moment is approximately 0.75 where $\eta$ is approximately 0.8, representing a 25% decrease in bending moment at that wing spanwise location.

The tab also significantly reduces the wing torsional loads that would otherwise be encountered upon deflection of the outboard aileron. With reference to FIG. 7, it will be seen that the wing torsional load is only slightly increased by the deflection of a tabbed aileron over the wing torsional load encountered when the outboard aileron is faired. The relative torsional load peaks at a value of approximately 1.7, where $\eta$ is approximately 0.65, which should be contrasted with the peak relative torsional load of substantially 3.5 obtained at that wing spanwise location through the use of a plain aileron. It will be also noted that the decrease in wing torsional load occasioned by the use of the tabbed aileron is most significant at the outboard wing spanwise locations.

The slight increases in wing torsional loads occasioned by the use of a tabbed aileron, over those encountered with no aileron deflection, can in most cases be accommodated by existing wing designs so that the tabbed aileron permits a wing load alleviation system to be retrofitted to an existing aircraft without the necessity of major wing redesign. In retrofitting, the primary advantage obtained from use of the wing load alleviation system is in increasing the maximum gross weight of the aircraft over the original design value thereof so as to increase the range or payload capability of the aircraft. More importantly, the use of a wing load alleviation system with tabbed ailerons permits new wing designs to be made in which the structural design requirements necessary to allow the wing to resist flexure in response to bending moments are reduced, thereby resulting in a reduced structural weight for the wing components. Further, incorporation of tabbed ailerons may permit the aileron reversal speed to be raised above the maximum certified airspeed of the aircraft so that wing load alleviation may be provided at all normal operating airspeeds.

The design factors that are related to the choice of a specific tab configuration are numerous, but it should be noted that since it is the aerodynamic forces acting on the tab that effect wing bending moment and wing torsional load, a variation in the configuration of the tab relative to its associated outboard aileron which increases the aerodynamic effectiveness of the tab relative to the outboard aileron will correspondingly decrease the torsional load and increase the bending moment obtained upon deflection of the outboard aileron under control of the wing load alleviation system. To increase the relative tab aileron aerodynamic effectiveness, either the tab/aileron chord ratio, the tab/aileron span ratio, or the tab/aileron deflection angle ratio, or any combination thereof, may be increased.

Figure 8:
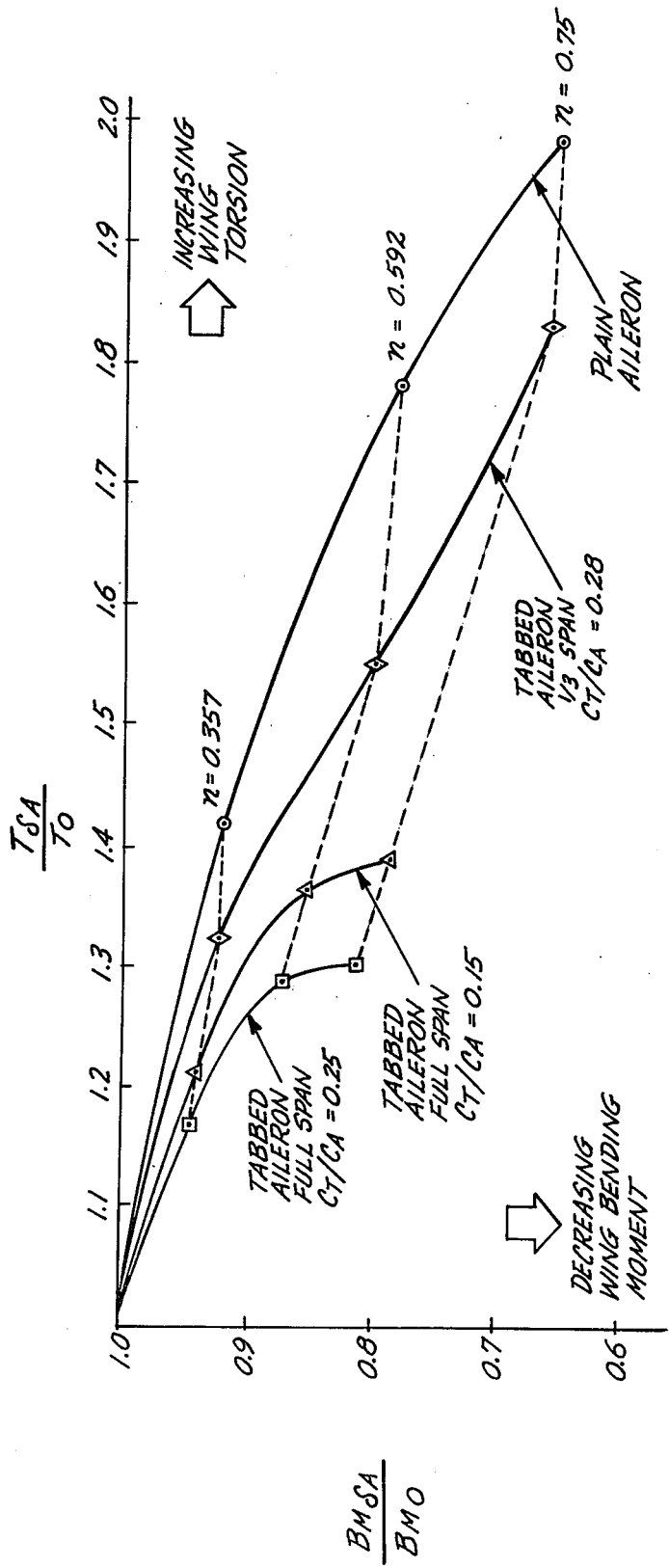
FIG. 8 is a graph illustrating the variation in relative bending moment with variation in relative torsional load of the wing for plain aileron and for various tabbed aileron configurations.

In FIG. 8, both relative bending moment and relative torsional load are plotted as a function of wing spanwise location for a wing load alleviation system having four separate aileron configurations: a plain or untabbed aileron; a tabbed aileron in which the tab span is $\frac{1}{3}$ of the aileron span, and $C_T/C_A$ equals 0.28; a tabbed aileron in which the tab span is equal to the aileron span, and $C_T/C_A$ equals 0.15; and a tabbed aileron in which the tab span equals the aileron span, and $C_T/C_A$ equals 0.25. The data represented in FIG. 8 is calculated for an aircraft of the type illustrated in FIG. 1 and for the same conditions previously discussed with respect to FIGS. 6 and 7, including $\delta_A = -25°$ and $\delta_T/\delta_A = 1$. As can be seen, an increase in the tab/aileron span ratio, or an increase in the tab/aileron chord ratio, or a combination thereof, generally results in a decreased relative torsional load and an increased relative bending moment. As a specific example, the use of a $\frac{1}{3}$ span tab permits substantially the same amount of bending moment relief to be obtained as is the case with the plain aileron, while yet affording a significant reduction in wing torsional loads at the outboard wing spanwise locations. As the tab span is increased to the full aileron span, further wing torsional load reduction is achieved, but at the expense of a reduction in the amount of bending moment relief achieved. Those skilled in the art will recognize that changing the tab/aileron deflection angle ratio results in a similar set of curves to that illustrated in FIG. 8, with progressively decreasing relative wing torsional loads and progressively increasing relative wing bending moments being obtained for progressively increasing tab/aileron deflection angle ratios.

Therefore, it is to be recognized that the present invention is not limited to any specific tab configuration, but rather that the choice of a tab configuration is to be determined by the overall design objectives of the wing load alleviation system and the design requirements of the wing with which the wing load alleviation system is to be used. There are, however, certain limits upon the above-noted design factors, the most obvious of which is that the tab/aileron span ratio cannot exceed 1. As those skilled in the art will also recognize, the upper limits upon the tab/aileron chord ratio and the tab/aileron deflection angle ratio are determined by the points at which the aerodynamic forces acting on the tab have a greater effect upon the wing than the aerodynamic forces acting upon the aileron. The lower limits are determined by the points at which the tab loses its aerodynamic effectiveness relative to its associated aileron. For a full span tab, it is presently believed that the tab/aileron chord ratio should be in the range of substantially 0.15 to substantially 0.5, and that the tab/aileron deflection angle ratio should be in the range of substantially 0.4 to substantially 1.5.

With reference now to FIGS. 9-14, a practical embodiment of a tabbed aileron suitable for retrofitting of an existing aircraft of the type illustrated in FIG. 1 will be described.

The left wing 100 of the aircraft includes an outboard aileron 102 having a trailing edge tab 104. Corresponding structure in the right wing of the aircraft is a mirror image of that illustrated in FIGS. 9-14 and is therefore neither illustrated nor described. The outboard aileron 102 is positioned on the wing 100 at the same location as is the outboard aileron 24 on the left wing of the aircraft illustrated in in FIG. 1 and has an inboard end 102A which faces the root of the wing 100, an outboard end 102B which faces the tip of the wing 100, and a trailing edge 102C which is substantially coincident with the trailing edge 100A of the wing 100. The tab 104 is located in a notch formed in the trailing edge 102C of the outboard aileron 102 and adjacent the inboard edge 102A, with the tab 104 having an inboard end 104A substantially coincident with the inboard end 102A, an outboard end 104B which is intermediate the inboard and outboard ends 102A, 102B, and a trailing edge 104C which is substantially coincident with the trailing edge 102C of outboard aileron, 102 and therefore with the traling edge 100A of the wing 100. As illustrated, the tab/aileron span ratio is approximately 0.545 and the tab/aileron chord ratio is approximately 0.33.

The outboard aileron 102 is pivotally supported from the wing 100 at a plurality of support points 106 which are spaced along a spanwise axis of the wing 100, and tab 104 is pivotally supported from the outboard aileron 102 at a plurality of support points 108 which are spaced apart along a spanwise axis of the outboard aileron 102.

FIG. 10 is an expanded portion of the plan view in FIG. 9 in the vicinity of the arrow 109 in FIG. 9, and FIG. 11 is a cross sectional view taken along lines 11—11 in FIG. 10. FIG. 12 is an expanded portion of the plan view in FIG. 9 in the vicinity of the arrow 111 in FIG. 9, and FIG. 13 is a cross sectional view taken along the lines 13—13 in FIG. 12. FIG. 14 is a cross sectional view corresponding to FIG. 13, but with the outboard aileron 102 and the tab 104 in deflected positions.

The wing 100 includes a spanwise-extending, rear spar 110 to which is attached, at each of a plurality of spanwise locations corresponding to the support points 106, a pair of chordwise-extending, upper and lower ribs 112. Each pair of ribs 112 has affixed thereto an aileron pivot support member 114 which defines therein a spanwise-extending aperture for receiving an aileron pivot pin 116. Likewise, the outboard aileron 102 has a spanwise-extending front spar 118 to which is affixed, at each of the plurality of spanwise locations corresponding to the support points 106, an aileron pivot bracket 120. Each aileron pivot bracket 120 is provided with a spanwise-extending aperture in which is received the pivot pin 116 supported in a corresponding one of the pivot support members 114, as a result of which the outboard aileron 102 is free to pivot about an aileron pivot axis defined by the spanwise alignment of the pivot pins 116. Pivotal rotation of the outboard aileron 102 with respect to the wing 100 is accomplished by means of an actuator 122, which is schematically shown (FIGS. 10 and 11) as a hydraulic cylinder 122A which is pinned at one end thereof to a channel 124 extending between adjacent pairs of ribs 112. A piston shaft 122B extends from the other end of cylinder 122A and is secured by means of a pin 125 to an actuator bracket 126 affixed to the front spar 118 of outboard aileron 102. As best seen in FIG. 11, pin 125 is offset from the aileron pivot pins 116 so that extension and retraction of the piston shaft 122B causes the outboard aileron 102 to respectively deflect downwardly and upwardly with respect to wing 100. The actuator 122 in practice may be of a type previously described in conjunction with actuator 50 in FIG. 4, and may accordingly be responsive to the sum of a mechanical aileron command from the pilot and a mechanical output from the aileron series servo of the wing load alleviation system to extend or retract the piston shaft 122B to effect relative deflection of the outboard aileron 102.

The outboard aileron 102 also includes a spanwise-extending, rear spar 128 to which is affixed, at each of a plurality of spanwise locations corresponding to the support points 108, a tab pivot support member 130. Defined in each of the tab pivot support members 130 is a spanwise-extending aperture in which is received a tab pivot pin 132. Likewise, the tab 104 includes a spanwise-extending spar 134 to which is affixed, at each of the plurality of spanwise locations corresponding to the support points 108, a tab pivot bracket 136 which has defined therein a spanwise-extending aperture in which is received the pivot pin 132 of the corresponding pivot support member 130. As a result, the tab 104 is free to pivotally rotate with respect to the outboard aileron 102 about a spanwise axis passing through the pivot pins 132.

In order to effect relative deflection of the tab 104 with respect to the outboard aileron 102 as the outboard aileron 102 is deflected under control of the actuator 122, a link support member 138 is affixed to the rear spar 110 of the wing 100 at each spanwise location adjacent the support points 108. As best seen in FIGS. 11 and 12, each link support member 138 is pinned at a first end thereof to the rear spar 110 and has an enlarged, second end thereof in which are defined a plurality of spanwise-extending apertures 140A, 140B, 140C and 140D. For each link support member 138, there is provided a brace 142 which is pinned at a first end thereof to rear spar 110 and which is pinned at a second end thereof to the second end of its associated link support member 138, so that the aperture 140A in each of the link support members 138 is aligned with the pivot pins 116, and therefore with the pivot axis of the outboard aileron 102. The remaining apertures 140B, 140C and 140D are accordingly offset from the outboard aileron pivot axis. A link 144, in the form of an elongated rod, is associated with each link support member 138 and has a first end which is pivotally secured to its associated link support member 138 by a first link pivot pin 146. From its connection to its associated link support member 138, each link 144 extends through the outboard aileron 122 in the chordwise direction thereof, with link 144 passing through corresponding apertures in the front spar 118 and the rear spar 128. At the spanwise location of each link support member 138, a link pivot bracket 148 is affixed to the spar 134 of tab 104. Each link pivot bracket 148 defines a spanwise-extending aperture therein in which is received a second link pivot pin 150 which also passes through the second end of the associated link 144. The pivot pins 150 are aligned along a spanwise axis of the tab 104, and are offset fom the pivot pins 132 so that relativemotion between the pivot pins 150 and pivot pins 132 causes the tab 104 to pivotally rotate about the pivot pins 132.

Since the links 144 have a fixed length, it will be seen that when each of the links 144 is pinned in the aperture 140A of its associated link support member 138, and the outboard aileron 102 is deflected, there will be no relative motion between the pivot pins 150 and the pivot pins 132 inasmuch as the apertures 140A are aligned with the pivot axis of the outboard aileron 102. However, when the links 144 are pinned in any one of the other apertures 140B, 140C or 140D, deflection of the outboard aileron 102 will result in relative motion between the pivot pins 150 and pivot pins 132 which will cause a deflection of the tab 104 in a direction opposite to the direction of deflection of the outboard aileron 102. For example, as illustrated in FIG. 14, with the link 144 being pinned in aperture 140D, upward deflection of the outboard aileron 102 through an angle $-\delta_A$ results in a corresponding relative downward deflection of the tab 104 through an angle $-\delta_T$. The spacing of the apertures 140B, 140C and 140D from aperture 140A, and from each other, is chosen to represent predetermined tab/aileron deflection angle ratios, e.g., aperture 140B represents the preferred ratio of 1. Accordingly, a means is provided for selectively adjusting the tab/aileron deflection angle ratio. If desired, the length of each link 44 may be adjustable (by using a rod whose ends can be threaded in and out) to accordingly allow adjustment of the rigging angle of the tab 104 with respect to the outboard aileron 102 when the outboard aileron 102 is faired with respect to the wing 100.

Since the tabbed aileron reduces the overall aerodynamic effectiveness of its associated outboard aileron, it will be appreciated that a corresponding reduction is obtained in the rolling moment produced when the outboard ailerons are deflected differentially to achieve roll control. Accordingly, it may be necessary in some retrofitting situations to modify the mechanical summing junction 48 (FIG. 4) so that a predetermined movement of the pilot's control stick produces the same amount of roll control as experienced with plain, or untabbed ailerons. Also, it is not necessary that the tab be mechanically linked to its associated outboard aileron, as a mechanism can be provided for independently deflecting the tab as the outboard aileron is deflected. In such a case, the tab may be deflected only under control of the wing load alleviation system, and locked out in response to pilot aileron deflection commands for roll control. Finally, those in the art familiar with wing load alleviation systems will recognize that the slight increase in wing torsional loads occasioned by the use of the tabbed aileron may induce a pitching moment in the aircraft, albeit less than that of a plain aileron, which may require the wing load alleviation system to provide an appropriate compensatory signal to the aircraft's elevators.

Although the invention has been described with respect to a preferred embodiment, it is to be clearly understood by those skilled in the art that the invention is not limited thereto, but rather that the scope of the invention is to be interpreted only in conjunction with the appended claims.

The embodiments of the invention in which an exclusive property or privilege is claimed are defined as follows:

1. In an aircraft having a hydraulically actuated wing load alleviation system wherein the outboard ailerons on each of the wings are symmetrically deflected to reduce increased aircraft wing loads caused by gusts and pilot-induced maneuvers occurring during flight, an improvement in the method of wing load alleviation comprising the additional step of deflecting a trailing edge tab pivotally supported on each said outboard aileron in aerodynamic opposition to the deflection of its associated outboard aileron so as to reduce wing torsional loads.

2. The improvement of claim 1 wherein the outboard ailerons are each deflected through an angle $\delta_A$ measured from a position in which each aileron is faired with its associated wing and each said tab is correspondingly deflected through an angle $\delta_T$ measured from a position in which each tab is faired with its associated aileron and wherein the ratio of said tab deflection angle $\delta_T$ to said aileron deflection angle $\delta_A$ is substantially constant.

3. The improvement of claim 2 wherein said ratio $\delta_T/\delta_A$ is in the range of substantially 0.4 to substantially 1.5.

4. The improvement of claim 1 wherein said tab is linked to its associated aileron in such a manner that the deflection of said tab occurs automatically upon deflection of said aileron by said wing load alleviation system.

5. In an aircraft having first and second opposing wings and first and second outboard ailerons, respectively, associated with said first and second wings and including a wing load alleviation system responsive to aircraft loads encountered during flight to rotate said first and second outboard ailerons in the same direction about the respective aileron pivot axes and including a tab and tab drive means associated with each of said first and second outboard ailerons, said tab being pivotally supported form its associated outboard aileron adjacent the trailing edge thereof for rotation about a spanwise extending tab pivot axis, an improvement in the method of wing load alleviation comprising the steps of rotating each of said tabs about its tab pivot axis as its associated outboard aileron is rotated about its aileron pivot axis, the direction of rotation of said tab being opposite to that of said associated outboard aileron.

6. The improved method of claim 5 wherein each said tab drive means includes a link support member supported from a wing of the aircraft and having a first aperture therethrough that is offset from the aileron pivot axis of its associated outboard aileron, a link pivot bracket supported by said tab and having a second aperture therethrough that is offset from said tab pivot axis, and a substantially fixed-length link member having a first end pinned in said first aperture and a second end pinned in said second aperture, such that said rotation of said tab is accomplished immediately upon rotation of said outboard aileron without direct operator intervention.

* * * * *

UNITED STATES PATENT AND TRADEMARK OFFICE
CERTIFICATE OF CORRECTION

PATENT NO. : 4,479,620

DATED : October 30, 1984

INVENTOR(S) : John T. Rogers et al.

It is certified that error appears in the above-identified patent and that said Letters Patent is hereby corrected as shown below:

Column 1, line 2 and title page: "ALLERONS" should be --AILERONS--

Column 2, line 17: add --at-- after "occurring"

Column 6, line 20: "reversalspeed" should be --reversal speed--

Column 6, line 40: "sucn" should be --such--

Column 7, line 8: "is" should be --in-- (second occurrence)

Column 7, line 41: "result" should be --results--

Column 10, line 47: delete "in" (second occurrence)

Column 10, line 60: "traling" should be --trailing--

Column 12, line 33: "relativemotion" should be --relative motion--

Column 14, line 22: "form" should be --from--

Signed and Sealed this

Seventh Day of January 1986

[SEAL]

Attest:

DONALD J. QUIGG

Attesting Officer

Commissioner of Patents and Trademarks